(Model.)

J. R. BROWN.
ALARM VALVE FOR AUTOMATIC FIRE EXTINGUISHERS.

No. 245,913. Patented Aug. 16, 1881.

WITNESSES:
Wm. L. Cook.
Joseph A. Miller Jr.

INVENTOR:
Joseph R. Brown
by Joseph A. Miller
Atty

UNITED STATES PATENT OFFICE.

JOSEPH R. BROWN, OF PROVIDENCE, ASSIGNOR OF TWO-THIRDS TO HENRY A. STEARNS, OF LINCOLN, RHODE ISLAND, AND JOHN M. HALL, OF WALLINGFORD, CONNECTICUT.

ALARM-VALVE FOR AUTOMATIC FIRE-EXTINGUISHERS.

SPECIFICATION forming part of Letters Patent No. 245,913, dated August 16, 1881.

Application filed March 14, 1881. (Model.)

*To all whom it may concern:*

Be it known that I, JOSEPH R. BROWN, of the city and county of Providence, and State of Rhode Island, have invented a new and useful Improvement in Alarm-Valves for Automatic Fire-Extinguishers; and I hereby declare that the following is a full, clear, and exact description of the same, reference being had to the accompanying drawings, forming part of this specification.

This invention has reference to an improvement in valves used to give an alarm when, in a system of automatic fire-extinguishers, one or more of the distributers are opened.

The object of this invention is to prevent the valve from giving the alarm when by a sudden change of pressure the column of water is disturbed.

The invention consists in providing a byway arranged to equalize any sudden change in pressure and allow such change to operate on both sides of the valve-disk, as will be more fully set forth hereinafter.

Figure 1:
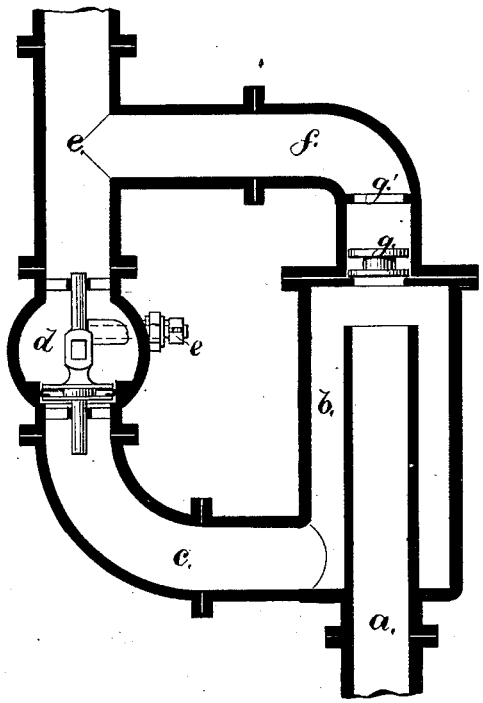
Figure 2:
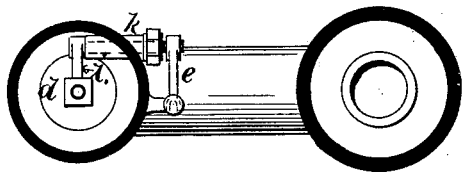
Figure 3:
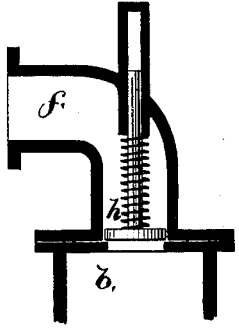

Figure 1 is a sectional view of my improved alarm-valve. Fig. 2 is a horizontal sectional view, showing the lever connected with the valve, by which the motion of the valve is transmitted to the outside of the valve casing. Fig. 3 represents a modification of the bypass-valve.

When a building is protected with a system of automatic fire-extinguishers a valve is required which will give notice, by detaching or otherwise operating an alarm, when one or more of the distributers have been opened by fire, or when, from any cause, water is being discharged from the system, so that the cause of such discharge can be ascertained and water damage avoided. When in such a system the service-pipe is connected with the street-main, or with a main from which water is drawn at intervals, variations in pressure are caused which affect the alarm-valve. One serious difficulty is the water-hammer caused by the sudden closing of a discharge from the water-main. Such sudden changes in pressure cause the valve to move and the alarm to be operated when neither a fire nor any other cause for alarm exists.

To avoid these false alarms is the main object of this invention.

In the drawings, $a$ represents the water-main by which water is supplied to a system of automatic fire-extinguishers.

$b$ is a cylinder of considerably larger diameter than the water-main. To the lower end of the cylinder $b$ the service-pipe $c$ is secured, leading to the valve $d$, and above the valve the T-shaped pipe $e$ forms a continuation of the service-pipe to the system of automatic fire-extinguishers, and a branch, to which the elbow $f$ is secured, forming a connection with the upper end of the cylinder $b$. The upper outlet from the cylinder $b$ is provided, as shown in Fig. 1, with the double-seat valve $g$, having an upper and a lower valve-seat and fitting loosely in the pipe $f$.

When a water-main is opened to draw water, and after the water is fully in motion, the outlet is suddenly closed. The arresting of the momentum causes a sudden shock and great increase of pressure, which affects the whole system supplied by the main. This sudden increase of pressure is communicated through the line of least resistance, which is the axis of the pipe.

Referring now to Fig. 1, the operation of the device is as follows: The system of pipes being filled with water in the usual manner, there will be places in the pipes where small quantities of air are lodged. When, now, by any means, the pressure in the supply-main is suddenly increased, the sudden movement of the water in the main $a$ will raise the valve $g$ off its seat and allow some water to pass by the valve $g$, which will, however, seat itself instantly. The sudden pressure is therefore transmitted to the upper part of the valve $d$ as quickly as, if not more quickly, than on the lower part. The valve $d$ will not be disturbed by such change of pressure, and a false alarm avoided. When, however, one or more of the automatic fire-extinguishers are opened, the loose fit of the valve $g$ will not allow sufficient water to pass by the same, and the valve $g$, which is made as light as possible, will be carried against the upper seat, $g'$, and prevent the flow of water through the pipe $f$. The valve $d$ will now be raised by the reduction of the pressure on its upper face, and the alarm will be sounded.

In place of the valve $g$, the spring-pressed valve $h$ may be used and the same result obtained.

The valve $d$ is connected by means of an arm, $i$, with a rock-shaft placed into a stuffing-box, $k$, which rock-shaft is provided outside the valve-case with the arm $l$. This arm therefore moves with the valve, and various devices may be operated with the arm $l$ to set an alarm in motion. It may connect or disconnect an armature, thus causing an electric alarm; or it may disconnect any other kind of an alarm.

Having thus described my invention, I claim as new and desire to secure by Letters Patent—

1. The combination, substantially as before set forth, of the alarm-valve in a service-pipe, a byway leading from the main to the service-pipe above the alarm-valve, and a valve in the byway.

2. The combination, with the service-pipe $c$ and valve $d$, of the chamber $b$, the inlet-pipe $a$, extending above the lower outlet, and the bypass $f$, provided with the valve $g$, whereby the pressure on the alarm-valve is equalized, as described.

3. The combination, with the inlet-pipe $a$, the chamber $b$, the service-pipe $c$, connected with the lower end of the chamber $b$, the valve $d$, the T-pipe $e$, and bypass-pipe $f$, of a valve constructed to rise and allow water to pass through the bypass, as and for the purpose set forth.

JOSEPH R. BROWN.

Witnesses:
JOSEPH A. MILLER,
J. A. MILLER, Jr.